United States Patent [19]

Takase

[11] Patent Number: 5,355,926

[45] Date of Patent: Oct. 18, 1994

[54] PNEUMATIC RADIAL TIRES FOR TWO-WHEELED VEHICLES

[75] Inventor: Kiyoshi Takase, Kodaira, Japan

[73] Assignee: Bridgestone Corporation, Tokyo, Japan

[21] Appl. No.: 967,397

[22] Filed: Oct. 28, 1992

[30] Foreign Application Priority Data

Nov. 6, 1991 [JP] Japan .................................. 3-289966

[51] Int. Cl.$^5$ .......................... B60C 9/18; B60C 9/20; B60C 9/22
[52] U.S. Cl. .................................. 152/527; 152/526; 152/531; 152/533
[58] Field of Search .................. 152/531, 533, 526–527

[56] References Cited

U.S. PATENT DOCUMENTS

| | | | |
|---|---|---|---|
| 5,176,770 | 1/1993 | Ohkuni | 152/531 X |
| 5,186,773 | 2/1993 | Oku et al. | 152/531 |

FOREIGN PATENT DOCUMENTS

| | | | |
|---|---|---|---|
| 0235579 | 9/1987 | European Pat. Off. | |
| 0319588 | 6/1989 | European Pat. Off. | |
| 0414470 | 2/1991 | European Pat. Off. | 152/531 |
| 3629955 | 3/1988 | Fed. Rep. of Germany | |
| 2128904 | 5/1990 | Japan | 152/533 |
| 659419 | 4/1979 | U.S.S.R. | 152/526 |

Primary Examiner—Michael Ball
Attorney, Agent, or Firm—Sughrue, Mion, Zinn, Macpeak & Seas

[57] ABSTRACT

A pneumatic radial tire for a two-wheeled vehicle, including a carcass constituted by at least one carcass ply composed of cords extending at an angle of 75° to 90° with respect to an equatorial plane of the tire, and a belt constituted by at least two belt plies. The belt plies is arranged radially outwardly on an outer peripheral side of a crown portion of the carcass, and composed of cords extending substantially in a circumferential direction of the tire. The number of the cords per unit width of an outermost belt ply is in a range of 30% to 80% of that of a belt ply adjacent radially inwardly to the outermost belt ply as considered on the average over the entire width of the belt.

4 Claims, 6 Drawing Sheets

FIG._7
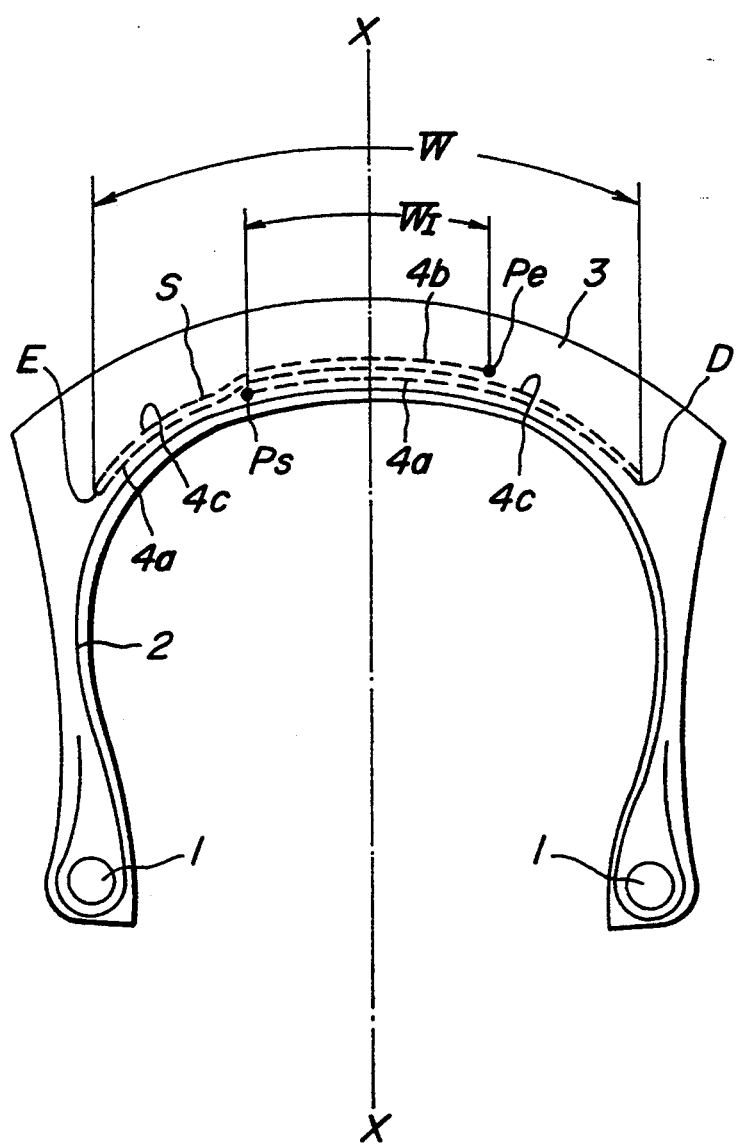

PNEUMATIC RADIAL TIRES FOR TWO-WHEELED VEHICLES

BACKGROUND OF THE INVENTION

(1) Field of the Invention

The present invention relates to pneumatic radial tires for two-wheeled vehicles, and particularly to a belt structure therefor. The invention is specifically aimed at increasing tread-gripping forces in the case that the vehicle turns, reducing the number of working steps in the formation of the belt, and decreasing the weight of the tire.

(2) Related Art Statement

Conventional pneumatic radial tires for two-wheeled vehicles have been heretofore known, in which a belt is provided on a radially outer peripheral side of a crown portion of a carcass by forming one belt ply through spirally winding one cord or a unit of plural cords around the crown portion of the carcass in parallel to the tire equatorial plane. It is confirmed that such tires can afford high speed durability and high speed stability.

However, the tire of this type has low bending rigidity in a widthwise sectional plane. Accordingly, particularly when a vehicle is turned under application of a camber angle to the tire, rigidity is insufficient in a shoulder portion of a tread, and therefore high tread-gripping forces cannot be unfavorably obtained. This defect is more serious with the increase in the turning speed.

Under the circumstances, as disclosed in Japanese patent application Laid-open No. 3-74,205, a technique has been proposed, in which bending rigidity is increased within a widthwise sectional plane of the tire by extending cords in a radially innermost cord ply in an angle of 40° to 90° with respect to an equatorial plane of the tire and extending cords in a cord ply adjacent radially outwardly to the radially innermost cord ply also in parallel to the tire equatorial plane, while spirally extending the cords of the radially outward cord ply in a width direction of the tire.

However, the proposed technique needs an additional step to bond the innermost cord ply on forming the tire, which unfavorably increase the number of working steps and the weight of the tire.

SUMMARY OF THE INVENTION

The present invention has been accomplished through investigations to solve the above-mentioned problems possessed by the prior art, and the invention is aimed at the provision of radial tires for two-wheeled vehicles, which can sufficiently reduce the number of the working steps for the preparation of the belt, can effectively prevent increase in weight of the tire, have excellent high speed stability, and particularly improve tread-gripping forces on turning of the vehicle.

The pneumatic radial tire for the two-wheeled vehicle according to the present invention comprises a carcass constituted by at least one carcass ply composed of cords extending at an angle of 75° to 90° with respect to an equatorial plane of the tire, and a belt constituted by at least two belt plies, said belt plies being arranged radially outwardly on an outer peripheral side of a crown portion of said carcass and composed of cords extending substantially in parallel to the tire equatorial plane, wherein a number of the cords per unit width of an outermost belt ply is in a range of 30% to 80%, preferably in a range of 40% to 60% of that of a belt ply adjacent radially inwardly of said outermost belt ply as considered over an entire width of the belt.

According to the pneumatic radial tire for the two-wheeled vehicle of the present invention, since the cords in the belt plies extend substantially in parallel to the tire-circumferential direction or the tire-equatorial plane direction, the tire can exhibit excellent high speed durability and high speed stability under excellent ground-contacting property as described above in connection with the prior art. Further, since the tire is provided with at least two belt plies, bending strength is advantageously increased within a widthwise sectional plane of the tire, particularly, to effectively enhance the tread-gripping forces when the vehicle turns.

In addition, since each belt ply can be formed in this tire by spirally winding one cord or a unit of plural cords around the crown portion of the carcass with use of an automatic winding machine, the belt ply, and accordingly the belt can be rapidly formed by a smaller number of the working steps. Furthermore, the weight of the tire can be effectively reduced by setting the number of the cords per unit width of the outermost belt ply in the belt at 30% to 80% of that of the belt ply adjacent radially inwardly to the outermost belt ply as considered over the entire width of the belt.

The reason why the number of the cords per unit width of the outermost belt ply in the belt is set at 30% to 80% of that of the belt ply adjacent radially inwardly to the outermost belt ply as considered over the entire width of the belt is that if the above number of the cords per unit width of the outermost belt ply is less than 30%, bending rigidity in the widthwise sectional plane of the tire cannot be fully enhanced, whereas if this number of cords per unit width is more than 80%, rigidity becomes too great, or the weight cannot be reduced so much.

These and other objects, features and advantages of the invention will be appreciated upon reading of the following description of the invention, when taken in conjunction with the attached drawings, with the understanding that some modifications, variations and changes of the same could be made skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein:

FIG. 3 through 7 are sectional views of embodiments of the pneumatic radial tires according to the present invention as taken in the tire width direction.

DETAILED DESCRIPTION OF THE INVENTION

Specific embodiments of the present invention will be explained below with reference to the attached drawings.

Figure 1:
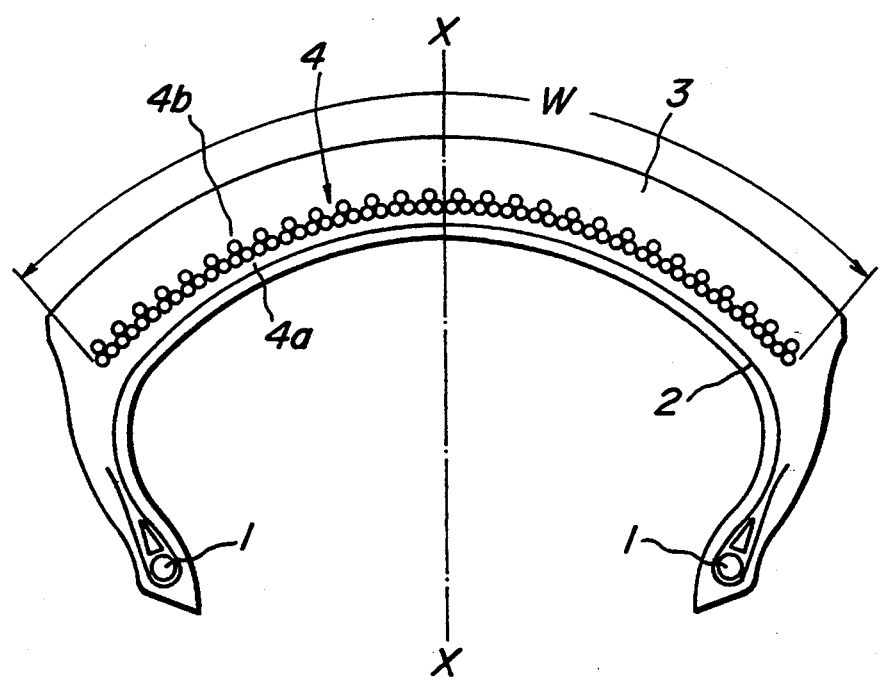
FIG. 1 is a sectional view of an embodiment of the pneumatic radial tire according to the present invention as taken in a width direction of the tire.

FIG. 1 is a sectional view of one embodiment of the present invention as taken in the tire-width direction. In FIG. 1, a carcass 2 extends between a pair of two bead cores 1.

In this embodiment, the carcass 2 consists of a single carcass ply composed of cords extending at an angle of 75° to 90° with respect to the circumferential direction of the tire, and a belt 4 is arranged on a radially outer side of a crown portion of the carcass 2. This belt 4 has a width substantially equal to the entire width of the tread 3. In the illustrated embodiment, the belt 4 is composed of two belt plies 4a and 4b adjacent radially to each other on outer and inner sides. Each of the belt plies 4a and 4b is formed by spirally winding a single belt ply cord or a plurality of belt ply cords radially outwardly around the carcass 2, so that the cords in each of the belt plies may extend substantially in the circumferential direction of the tire.

Figure 2A:
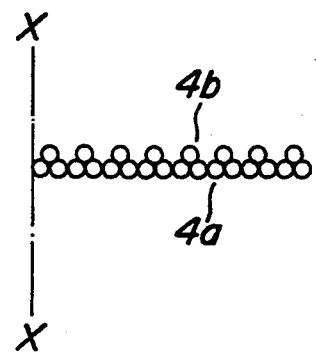
FIG. 2(a) is a sectional view of a belt of the tire in FIG. 1, in which the positional relationship between inner and outer plies is illustrated.
Figure 2B:
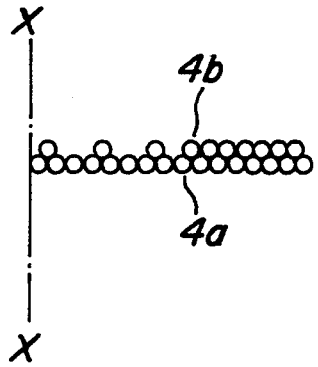
FIG. 2(b) is a sectional view of another belt to be used in the present invention, in which the positional relationship between inner and outer plies is also illustrated.

According to the tire in FIG. 1, the number of the cords per unit width of the radially outwardly located belt ply 4b in the two inner and outer belt plies 4a and 4b is set in a range of 30% to 80%, preferably 40% to 60% of that of the compactly wound belt ply located on the radially inner side of the belt ply 4b, as considered over the entire width W of the belt 4. The arrayed state of the cords in the belt ply 4b with respect to the cords in the belt ply 4a may be in a state in FIG. 2(a) or FIG. 2(b). That is, in FIG. 2(a), the cords in the belt ply 4b are arrayed in a uniformly coarsely wound state to meet the above ratio relationship with respect to the number of the cords per unit width, whereas in FIG. 2(b), the cords in the belt ply 4b are so arranged as to have relatively coarsely wound portions and relatively closely wound portions depending upon the locations of the belt in the width direction.

In the embodiment, the cords constituting the belt plies 4a and 4b are preferably steel cords or organic fiber cords made of such as aromatic polyamide, polyvinyl alcohol, nylon, polyester, and high modulus polyester.

Particularly when low elastic modulus cords such as nylon cords are used, it is possible that a belt ply may be formed by first forming a band-like strip (ribbon-shaped member) through coating a plurality of parallel cords with rubber and winding the thus formed strip around the carcass. By so doing, productivity can be greatly improved as compared with the case where a single cord is spirally wound.

According to the thus produced tire, as mentioned above, excellent high speed durability and high speed stability can be fully exhibited, and excellent treat-gripping forces can be obtained during turning. In addition, the number of working steps required for the tire-forming process in the case of the tire production can be effectively reduced, and also the weight of the tire thus produced can be effectively reduced.

Figure 3:
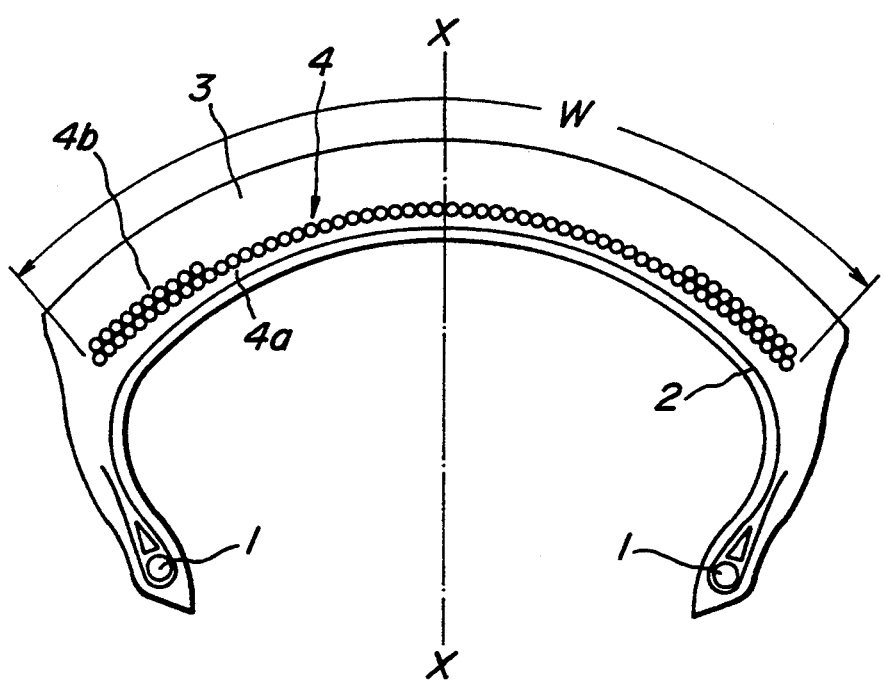

FIG. 3 is a sectional view of another embodiment of the present invention as taken along a width direction of the tire. In this embodiment, cords of a belt ply 4b located on a radially outer side of a belt 4 is arrayed splitly on axially opposite side portions of the belt 4 each over a width equal to about ¼ of that W of the belt such that the number of the cords of the belt ply 4b per unit width may be substantially equal to that of a radially inner belt ply 4a, whereas the cords of the radially outer belt ply 4b are completely omitted in a central portion of the belt 4 corresponding to about ½ of the width of the belt. Thereby, the number of the cords of the radially outer belt ply 4b is set in a range of 30% to 80% of that of the radially inner belt ply 4a as considered on the average over the entire width of the belt.

According to the tire of FIG. 3, since bending rigidity in the opposite side portions of the belt, and in its turn in opposite side portions of the tread is fully increased, the tread-gripping forces can be further enhanced in the case that the vehicle turns.

Figure 4:
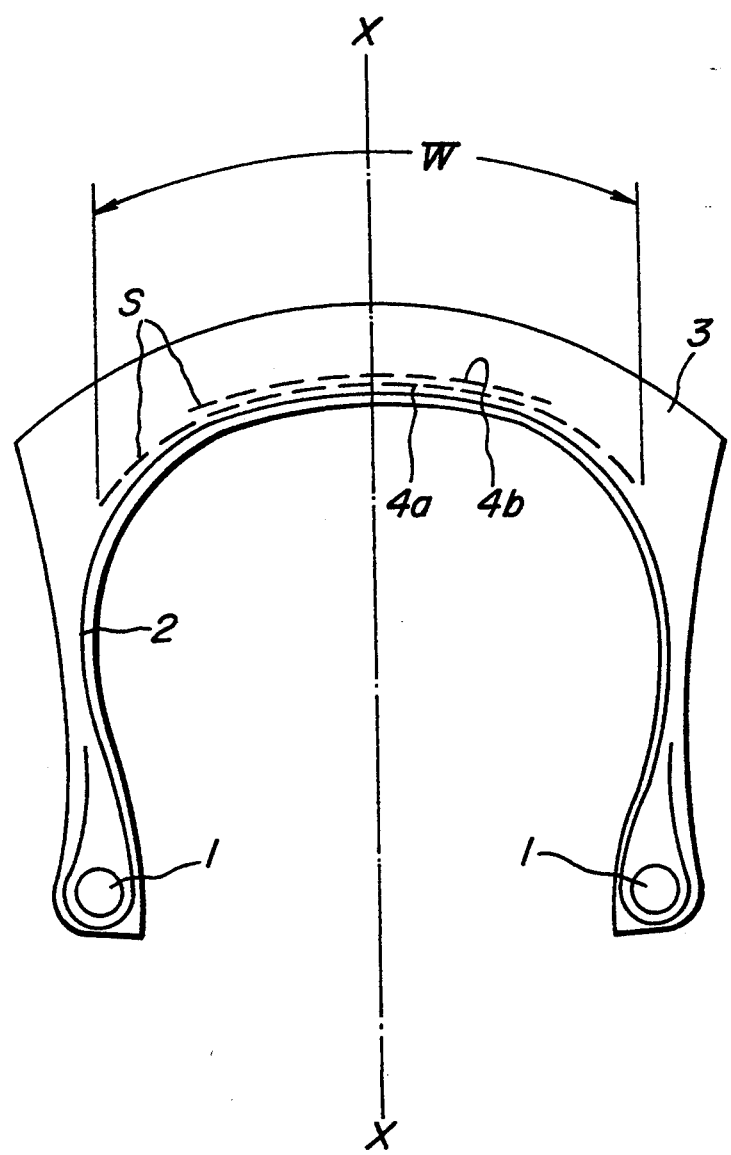

FIG. 4 is a sectional view of a still another embodiment of the present invention as taken along a tire-width direction. This embodiment is characterized in that radially inner and outer belt plies 4a and 4b are formed by first preparing a rubberized tape or a ribbon-shaped member S in which a plurality of cords are arrayed in parallel to each other and spirally winding the rubberized tape or the ribbon-shaped member around a carcass. The radially outer belt ply 4b is laterally symmetrically arranged with respect to the tire equatorial plane, and restricted in a location corresponding to a central portion of the tread 3. Only the radially inner belt ply 4a is arranged in locations corresponding to opposite side portions of the tread. The belt plies 4a and 4b are formed by spirally winding the tape or ribbon-shaped member such that the tape or ribbon-shaped member may be substantially butted between adjacent turns thereof.

Figure 5:
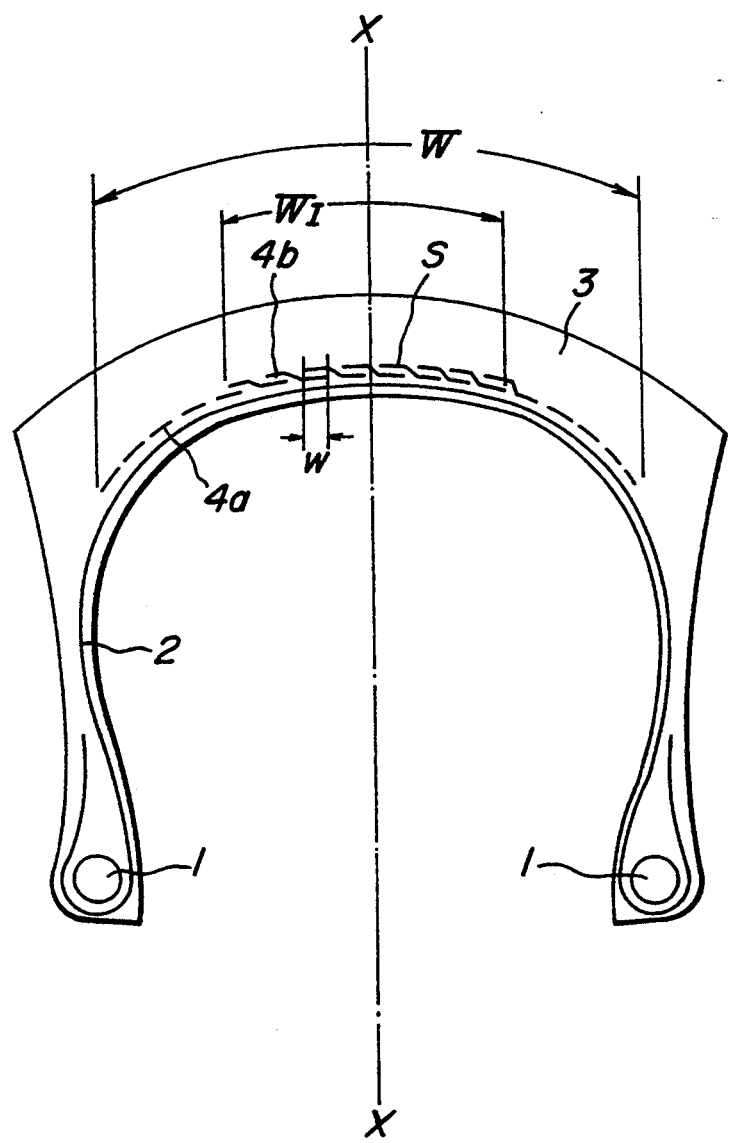

FIG. 5 is a sectional view of a still further embodiment of the present invention. This embodiment differs from that in FIG. 4 in that an inner belt ply 4a and an outer belt ply 4b are formed by spirally wrapping a tape S while partially overlapping the tape in a location corresponding to a central portion of the tread. An overlapped width w of adjacent turns of the tape is preferably 20% to 70% of the width of the tape S.

Figure 6:
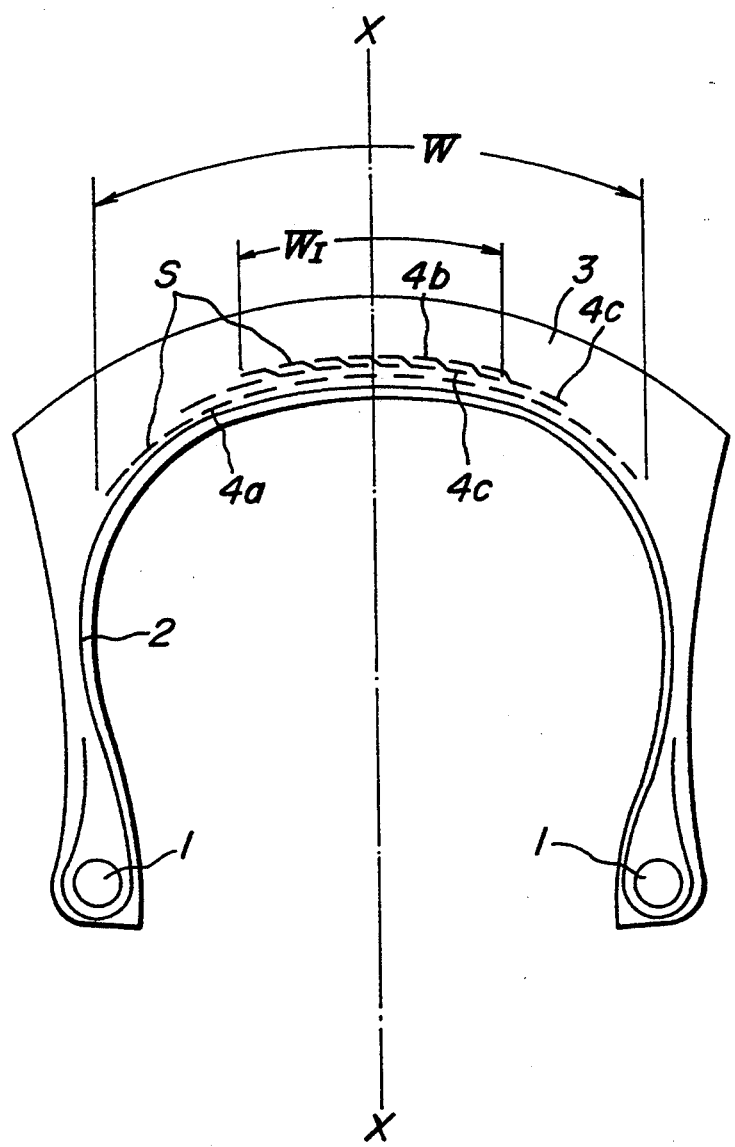

FIG. 6 is a radial sectional view of a still further embodiment of the present invention. This embodiment is characterized in that an inner belt ply 4a is formed by spirally wrapping a tape side by side as in the case of the inner belt ply 4a in FIG. 4, and an outer belt ply 4b is formed by partially overlapping the tape in a central location $W_1$. Consequently, a third belt ply is formed between the inner and outer belt plies 4a and 4b in this location $W_1$.

FIG. 7 is a radial sectional view of a still further embodiment of the present invention. This embodiment is characterized in that a belt is formed by spirally and circumferentially wrapping a tape from a starting point Ps inside a belt width W side by side toward an end point D, further continuing to wrap the tape around the continuously formed ply 4a toward an end point E when the tape reaches the point D, and finally wrapping the tape toward the end point D up to a terminal point Pe. By so doing, the outer belt ply 4b is located in a central portion $W_I$ between the points Ps and Pe, and a third belt ply 4c is formed over the entire belt width W on the radially outer side of the inner belt ply 4a.

In the following, explanation will be made on comparison tests conducted with respect to invention tires and comparison tires in terms of straight running stability, tread-gripping forces on cornering, tread rigidity and riding comfortability.

Invention Tire 1

Invention Tire 1 was a tire shown in FIG. 1 having a tire size of 170/60R17 in which a carcass was constituted by a single carcass ply composed of nylon cords (1500d/2) extending at 90° with respect to the tire circumferential direction, a belt was constituted by two belt plies composed of aromatic poly amide cords (1500d/2), and the number of the cords of the radially outer belt ply per unit width was set at 0.5 of that of the radially inner belt ply.

Invention Tire 2

Invention Tire 2 was a tire shown in FIG. 3 having a tire size of 170/60R17 in which a radially outer belt ply was splitly arranged in axially opposite side portions of the belt each over a width equal to ¼ of the width of the belt.

Comparison Tire 1

Comparison Tire 1 had the same construction as that of invention Tire 1 except that the radially outer ply was omitted.

Comparison Tire 2

Comparison Tire had the same construction as that of invention Tire 1 except that the number of the cords per unit width was made equal between the radially inner and outer belt plies.

Testing Method

Each of the above tires was fitted to a rear wheel of a sport type two-wheeled vehicle having a displacement of 750 cc, and run on a test course. Various performances were evaluated by feeling at that time.

Test Results

Test results are shown in Table 1. In Table 1, the greater the figure, the more excellent the result.

TABLE 1

|  | Straight running stability | Tread-gripping forces | Tread rigidity | Riding comfortability |
| --- | --- | --- | --- | --- |
| Invention tire | 7 | 8 | 7 | 7 |
| Invention tire | 7 | 8.5 | 7 | 7 |
| Comparison tire | 7 | 7 | 6 | 7 |
| Comparison tire | 7 | 7 | 7.5 | 6 |

According to Table 1, it is clear that invention Tire 1 can effectively enhance the gripping forces due to increase in the rigidity of the tread without deteriorating the riding comfortability, and invention Tire 2 can enhance the gripping forces on full banking without deteriorating the riding comfortability.

Although the tread rigidity largely increased in Comparison Tire 2, increase in the tread-gripping forces could not be recognized due to reduction in ground-contacting property.

As is clear from the above explanation, according to the present invention, the belt can be easily formed, the weight of the tire can be effectively reduced, the rigidity of the tread can be attained as desired, and the tread-gripping forces on cornering can be effectively enhanced.

What is claimed is:

1. A two-wheeled vehicle, pneumatic radial tire, comprising a carcass constituted by at least one carcass ply composed of cords extending at an angle of 75° to 90° with respect to an equatorial plane of the tire, and a belt constituted by at least two belt plies, each of said belt plies being arranged radially outwardly on and adjacent an outer peripheral side of a crown portion of said carcass and extending uniformly over the entire width of said belt, each of said belt plies composed of a single spirally wound cord extending substantially in a circumferential direction of the tire, wherein a number of the cords per unit width of a radially outermost belt ply is in a range of 30% to 80% of that of a compactly wound belt ply adjacent radially inwardly to said outermost belt ply as considered on the average over an entire width of the belt.

2. The pneumatic radial tire as set forth in claim 1, wherein the number of the cords per unit width of said outermost belt ply is in a range of 40% to 60% of that of the belt ply adjacent radially inwardly to said outermost belt ply as considered on the average over the entire width of the belt.

3. The pneumatic radial tire as set forth in claim 1, wherein the cords in the radially outermost belt ply are arranged in a uniformly coarsely wound state.

4. The pneumatic radial tire as set forth in claim 1, wherein the cords in said belt plies are cords selected from the group consisting of steel cords and aromatic polyamide cords, polyvinyl alcohol cords, nylon cords, polyester cords, and high modulus polyester cords.

* * * * *